(12) United States Patent
Devara

(10) Patent No.: US 6,813,619 B2
(45) Date of Patent: Nov. 2, 2004

(54) STORING AND USING PERSONAL PROFILE FROM THE REMOTE

(75) Inventor: Kavitha Vallari Devara, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 305 days.

(21) Appl. No.: 09/822,949

(22) Filed: Mar. 30, 2001

(65) Prior Publication Data

US 2002/0143771 A1 Oct. 3, 2002

(51) Int. Cl.$^7$ .............................................. G06F 17/30
(52) U.S. Cl. ........................................................ 707/10
(58) Field of Search ............................... 707/10, 104.1; 345/327; 359/143; 700/28; 455/556; 348/734

(56) References Cited

U.S. PATENT DOCUMENTS

| | | | |
|---|---|---|---|
| 3,752,904 A | 8/1973 | Waterbury | 178/5.1 |
| 3,896,266 A | 7/1975 | Waterbury | 179/1 |
| 4,381,522 A | 4/1983 | Lambert | 358/86 |
| 5,005,084 A | 4/1991 | Skinner | 358/194.1 |
| 5,692,214 A | 11/1997 | Levine | 395/833 |
| 5,790,201 A | 8/1998 | Antos | 348/552 |
| 5,839,052 A | 11/1998 | Dean et al. | 455/5.1 |
| 5,850,340 A | 12/1998 | York | 364/188 |
| 5,867,763 A | 2/1999 | Dean et al. | 455/5.1 |
| 5,875,108 A | 2/1999 | Hoffberg et al. | 364/146 |
| 5,953,670 A | 9/1999 | Newson | 455/454 |
| 6,008,777 A | 12/1999 | Yiu | 345/2 |
| 6,040,829 A * | 3/2000 | Croy et al. | 345/864 |
| 6,111,569 A | 8/2000 | Brusky et al. | 345/327 |
| 6,195,589 B1 * | 2/2001 | Ketcham | 700/28 |
| 6,292,283 B1 * | 9/2001 | Grandbois | 359/143 |
| 6,437,836 B1 * | 8/2002 | Huang et al. | 348/734 |
| 6,476,825 B1 * | 11/2002 | Croy et al. | 345/716 |
| 2002/0112237 A1 * | 8/2002 | Kelts | 725/39 |
| 2002/0173344 A1 * | 11/2002 | Cupps et al. | 455/566 |

FOREIGN PATENT DOCUMENTS

WO    WO 94/22242    * 9/1994    ........... H04B/10/10

* cited by examiner

Primary Examiner—Diane D. Mizrahi
(74) Attorney, Agent, or Firm—Dicran Halajian

(57) ABSTRACT

The present invention provides a method of and system for storing the personal information or profile of a user/customer on the remote instead of a digital television receiver/set top box. The information that is stored is personal information, such as name, address, etc., as well as commerce-related information, such as a credit card number. This information is then used to personalize the use of some electronic device and allow for faster, portable, more effective and more convenient e-commerce.

18 Claims, 2 Drawing Sheets

STORING AND USING PERSONAL PROFILE FROM THE REMOTE

FIELD OF THE INVENTION

The present invention relates to methods of and systems for utilizing a television or cable remote device to store personal information, and is more particularly concerned with the use of such a device to facilitate a variety of services, many of which are e-commerce-related.

BACKGROUND OF THE INVENTION

Television systems today are becoming more important as instruments for delivering electronic commerce ("e-commerce") and personalized services. E-commerce is the buying and selling of goods and services over the Internet. E-commerce and personalized services are very common in the Internet domain, wherein a user accesses world-wide-web sites and engages in buying and/or selling of goods or services.

Modern television is delivered either through a set top box or digital television receiver, which is operatively connected to the actual television monitor. Many of these set top boxes/digital television receivers are connected to cable, satellite, or other television sources, and the Internet. A "digital receiver device," as referred to herein, include set top boxes, digital television receivers and any other device capable of controlling the operation of an electronic device to which it is operatively connected.

Set top boxes/digital television ("STB/DTV") receivers are also operatively tied to a remote control device. A "digital remote device," as used herein, includes any remote control device capable of controlling a digital receiver device from some distance. Often, a remote control device resembles the standard television remote with buttons for selecting television stations volume control. Currently, personalized digital assistants ("PDAs") and even cellular telephones may be used as a television remote. A PDA is a hand-held, palm-top computer device.

Currently, it is possible to use cellular telephones and PDAs to perform e-commerce. Likewise, it is known to the prior art to access the Internet through STB/DTV receivers and perform e-commerce that way.

Another aspect of e-commerce is the "e-coupon." As used herein, an e-coupon is an electronic version of a paper coupon, entitling the bearer to some discount from the given price for goods or services.

Such e-commerce and personal services require gathering and storing of the user's or customer's personal information. Business models are being developed for securing transactions via STB/DTVs, PDAs and cellular telephones, and gathering personalized information from the user, without intruding into the privacy of the user.

The personal information, also referred to herein as "personal profile information" or "personal profile", may include but is not limited to one or more of the following of the user: name, credit card (or automated teller card) number, personal identification number, age, sex, profession, income bracket, favorite television programs, personal settings for the television (default channel, volume, etc), or any other information that might be user-specific (i.e., generally varies between users).

One problem with gathering a personal profile from the user is that they must often enter basic information each time a different television or Internet portal is used. Thus, such basic information as name, credit card number, personal identification number (for automated teller card use), age, and sex of the user/customer is repeatedly re-entered each time the user/customer attempts to create a transaction.

Another problem with gathering a personal profile from the user is that the user seldom wants to expend the time or effort to change their personal profile information as time progresses and both their tastes and programming availability change.

Although some STB/DTV receiver systems allow the user to input basic information one time, the user must enter a login/password each time they want to access the services of the specific portal site or broadcast station. This information does not survive from one such site/station to the next. Also, the STB/DTV receiver may service many users, each with their own set of personal information.

A need, therefore, still exists for a method of selectively operating an electronic device to provide for the preferences of the user, in which personal profile information that includes the user's preferences is transmitted from a digital remote control device to a digital receiver device, such that the digital receiver device can selectively control the operation of the electronic device to provide the personal preferences of the user.

SUMMARY OF THE INVENTION

It is, therefore, an object of the present invention to provide a method of and system for storing the personal information or profile of a user/customer on the remote instead of a digital television receiver/set top box. It is another object to store personal information of the user, such as name, address, etc., as well as commerce-related information, such as a credit card number on the remote. This information is then used to personalize the use of some electronic device and allow for faster, more convenient and more effective e-commerce.

The present invention, which addresses the needs of the prior art, provides in an embodiment, a digital remote control device which stores the personal profile information of a user in a database within the digital remote control device.

In another embodiment of the invention, the digital remote control device is a personal digital assistant.

In another embodiment of the invention, the user's personal profile information is input using the keypad and display of the digital remote control device.

In another embodiment of the invention, the user's personal profile information is input using the digital remote control device and a display controlled by the digital receiver.

In another embodiment of the invention, the user's personal profile includes one or more of the following items: user's name, address, telephone number, credit card number, personal identification number, other charge account information, e-commerce account information, age, sex, profession, favorite television programs, favorite personal television settings, and favorite Internet world-wide-web sites.

In another embodiment of the invention, the user's personal profile information is updated from the digital receiver device to include current user viewing habits from a set of electronic programming guide data available to the digital receiver device. Electronic programming guide data is frequently made available to digital receiver devices by content network providers.

In another embodiment of the invention, an Internet connection is established to engage in e-commerce.

In another embodiment of the invention, an e-coupon can be sent to or received by the digital remote control device for use in e-commerce. This could be obtained from the Internet, or through scanning bar-codes at a store or downloaded from the Digital Television broadcast during a product-placement or by any other means.

The invention also relates to a system for storing and using a user's personal profile information, which includes a digital receiver device operatively connected to an electronic device to be controlled, and a digital remote control device.

The digital remote control device is configured to perform the method described herein.

In another embodiment of the invention, the system includes a digital television receiver as the digital receiver device.

In another embodiment of the invention, the system includes a set top box as the digital receiver device.

In another embodiment of the invention, the system includes a digital remote control device which includes a computer-accessible memory operatively coupled to a microprocessor. The microprocessor is configured to operate a database to store the user personal profile information.

In another embodiment of the invention, the system includes a digital receiver device operatively coupled to a communication channel providing Internet access. The digital receiver device includes a computer-accessible memory, a microprocessor operatively coupled to the computer-accessible memory and to the communication channel. The microprocessor is configured to function as an Internet browser.

In another embodiment of the invention, the system includes a personal digital assistant as the digital remote control device. The personal digital assistant may itself have a computer-accessible memory operatively coupled to a microprocessor configured to function as an Internet browser.

In another embodiment of the invention, the system includes a cellular telephone as the digital remote control device. The cellular telephone may itself have a computer-accessible memory operatively coupled to a microprocessor configured to function as an Internet browser.

In another embodiment of the invention, the remote includes a scanner similar to a barcode reader that downloads e-coupons corresponding to the product by scanning the bar-code on the product at the store.

In another embodiment of the invention, the digital remote control device is configured to accept said user personal profile from a source external to the digital remote control device and the user. In this configuration, the digital remote control device could, for example, update its stored personal profile information for the user by feedback from the digital receiver device. This provides a great advantage over the prior art by freeing the user from having to expend the time and effort to change their personal profile information as time progresses and both their tastes and programming availability change.

Other improvements which the present invention provides over the prior art will be identified as a result of the following description which sets forth the preferred embodiments of the present invention. The description is not in any way intended to limit the scope of the present invention, but rather only to provide a working example of the present preferred embodiments. The scope of the present invention will be pointed out in the appended claims.

DETAILED DESCRIPTION OF THE PREFERRED EMBODIMENT

Figure 1:
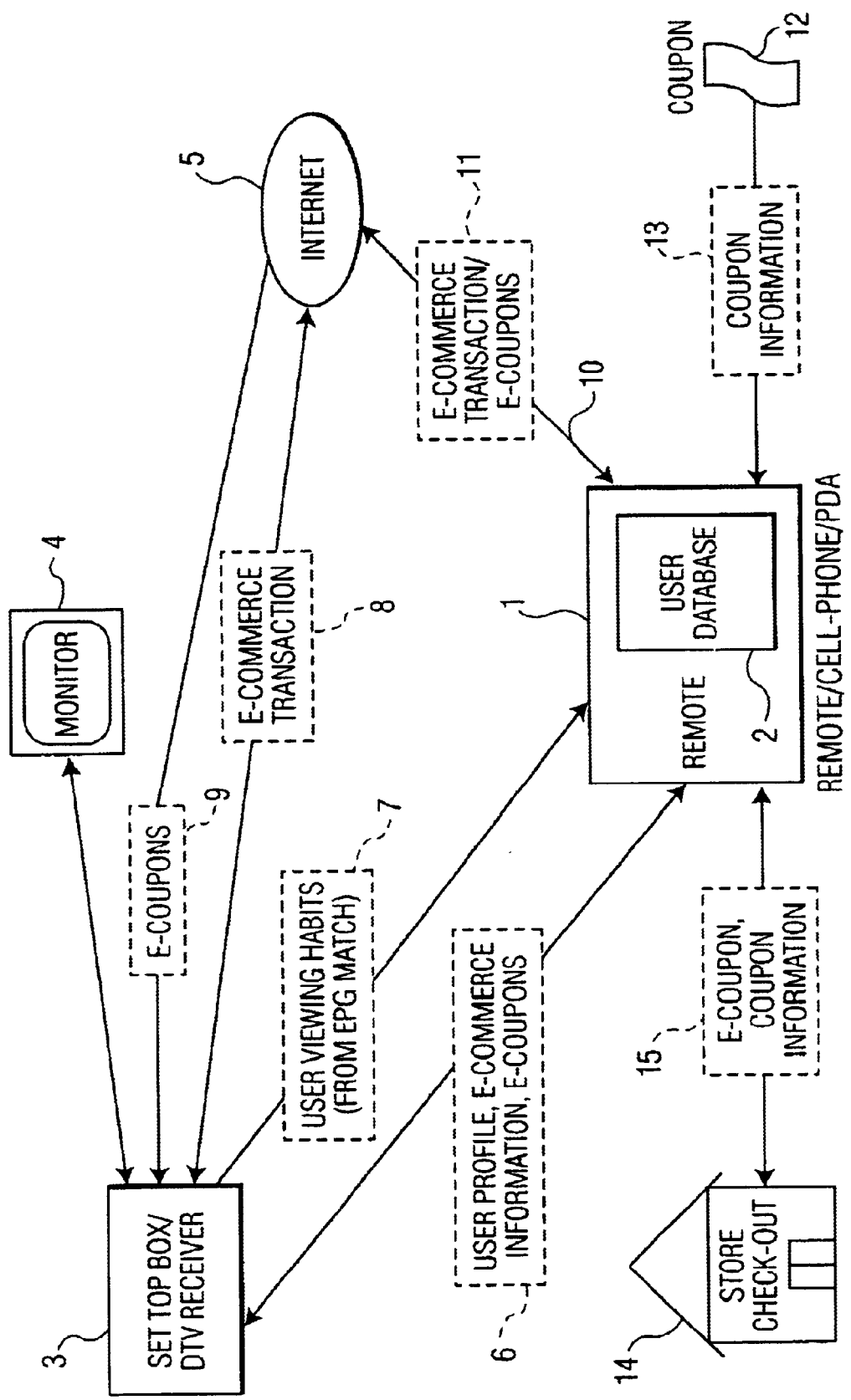
FIG. 1 is a block diagram illustrating one embodiment of utilizing a digital television receiver/set top box remote control device to store and use personal information according to the present invention.

One embodiment of the present invention is depicted in FIG. 1. A remote control device 1 is operatively connected to a set top box or digital television ("STB/DTV") receiver 3. The remote control device 1 may be a stand-alone special purpose device, a cellular telephone, or a personal digital assistant. The remote control device optionally includes a computer-readable storage and microprocessor to enable a user database 2.

The STB/DTV receiver 3 controls a television monitor 4. This television monitor 4 and STB/DTV receiver 3 may be two physically separate units, or they may be one physical unit. The STB/DTV receiver is optionally connected to the Internet 5 via an Internet communication channel 8, 9, and, in that case, the remote 1, STB/DTV receiver 3, and monitor 4 would be configured to operate as an Internet browser.

Alternatively, when the remote control device 1 is a web-enabled cellular telephone or personal digital assistant, access to the Internet can be made without the involvement of the STB/DTV receiver 3 or monitor 4.

While accessing the Internet, the remote-STB/DTV receiver-monitor combination, web-enabled cellular telephone, or personal digital assistant may facilitate e-commerce 8, 10 through various Internet portals, and engage in e-commerce transactions, including the use of e-coupons 11. The user may browse products and services on the world-wide-web and selectively purchase the same. When purchases are made this way, the present invention allows the user's personal profile information to be sent directly to the Internet portal site(s) at the user's discretion. The alternative to this advance in the state of the art is that the user would have to enter their personal information for each transaction. Although some Internet portals and world-wide-web vendor sites allow the user to maintain limited personal profile type information (e.g., name, address, credit card information, etc.), this information still must be re-entered for each different Internet portal or world-wide-web vendor site in which the user seeks to engage in e-commerce. It is thus an advantage of the present invention that this information may be stored directly on the remote control device, thus removing the need for the user to engage in often repetitive and time-consuming entry of personal profile information.

When the remote control device is a web-enabled cellular telephone or personal digital assistant, the user may access the Internet directly, bypassing the STB/DTV receiver 3 and monitor 4.

In another embodiment, user personal profile, e-commerce information and e-coupons may be sent 6 from the remote device 1 to the STB/DTV receiver 3. As an example, the user's personal profile may include their selection of their favorite television station. Sending this information 6 from the remote 1 to the STB/DTV receiver 3 at start-up time would allow the STB/DTV receiver 3 to turn on the monitor with that favorite television station as the current selection.

In another embodiment, the STB/DTV receiver 3 can send personal viewing habit information 7 back to the remote control device 1, which can optionally use this information to update the personal profile of the user in the user database 2.

In another embodiment, the information on a physical coupon 12 for goods or services can be entered into the remote 13, possibly by scanning a barcode on the coupon. This coupon information may then be used at the checkout area of a store 14, 15.

Figure 2A:
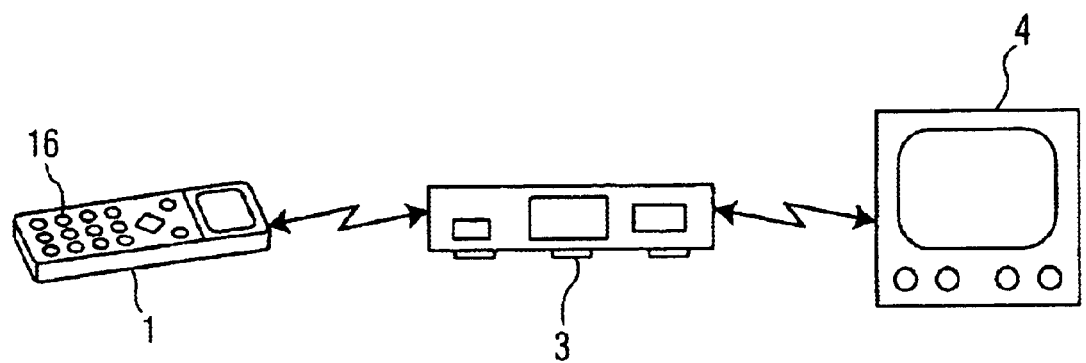
FIG. 2 includes figures depicting one embodiment of a user storing a personal profile onto a digital television receiver/set top box remote control device using either the device's keypad and a display controlled by the digital television receiver/set top box, or the keypad of the device and display according to the present invention.
Figure 2B:
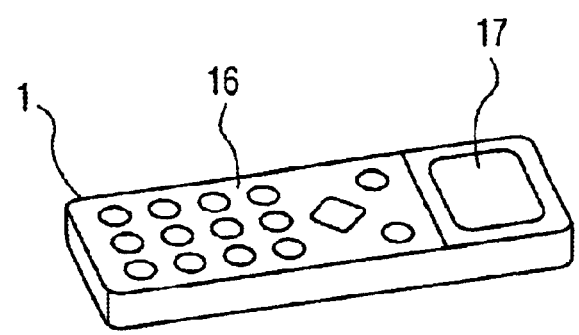

Referring now to FIG. 2, a diagram of the physical components involved in the user's input of personal profile information is shown. In the a. part of FIG. 2, the user operates the remote 1 by pressing the keypad on the remote 16. The user's input is sent to the STB/DTV receiver 3, which causes the display of information on television monitor 4.

In another embodiment, as shown in the b. part of FIG. 2, the user's remote 1 may have its own display 17. This allows the user to input personal profile information directly using the remote's keypad 16.

Although the system and method of the present invention has been described in connection with the described embodiments, it is not intended to be limited to the specific form set forth herein, but on the contrary, it is intended to cover such alternatives, modifications, and equivalents as can be reasonably included within the spirit and scope of the invention as defined by the appended claims.

What is claimed is:

1. A method of selectively operating an electronic device to provide preferences of a user, said method comprising:
   transmitting personal profile information that includes said preferences from a mobile control device to a digital receiver device including at least one of a digital television receiver, a set top box, and an Internet access device, such that said digital receiver device can selectively control the operation of the electronic device to provide said preferences thereby removing a need to manually enter said preferences.

2. The method of claim 1, wherein said mobile control device stores said personal profile information in a database located within said mobile control device.

3. The method of claim 1, wherein said mobile control device is a personal digital assistant (PDA), wherein said PDA includes a hand-held, palm-top computer device.

4. The method of claim 1, wherein input of said personal profile information is via a keypad/display combination on said mobile control device.

5. The method of claim 1, wherein input of said personal profile information is via a keypad on said mobile control device and a display controlled by said digital receiver device.

6. The method of claim 1, wherein said personal profile information includes one or more of a user's name, address, telephone number, credit card number, personal identification number, other charge account information, e-commerce account information, age, sex, profession, favorite television programs, favorite personal television settings, or favorite Internet world-wide-web sites.

7. The method of claim 1, wherein said method includes updating of said personal profile information from said digital receiver device to include current user viewing habits from a set of electronic programming guide data available to said digital receiver device.

8. The method of claim 1, wherein said method includes establishing an Internet connection and engaging in e-commerce.

9. The method of claim 1, further comprising sending or receiving of an e-coupon for use in e-commerce or at a store.

10. The method of claim 1, wherein said method includes input of physical coupon information into said mobile control device for use in e-commerce or at the store.

11. A system for storing and using personal profile information of a user, comprising:
    a digital receiver device including at least one of a digital television receiver, a set top box, and an Internet access device, operatively coupled to an electronic device to be controlled or a vendor to be accessed; and a mobile control device;
    said mobile control device being configured to:
       accept input of said personal profile information into said mobile control device;
       store said personal profile information on said mobile control device; and
       send said stored personal profile information to said digital receiver device to provide personal preferences of the user to said electronic device, thereby removing a need to manually re-enter said personal profile information.

12. The system of claim 11, wherein said mobile control device includes a computer-accessible memory operatively coupled to a microprocessor, said microprocessor being configured to operate a database to store said user personal profile information.

13. The system of claim 11, wherein said digital receiver device is operatively coupled to a communication channel providing Internet access, in which said digital receiver device includes:
    a computer-accessible memory; and
    a microprocessor operatively coupled to said computer-accessible memory and said communication channel, said microprocessor being configured to function as an Internet browser.

14. The system of claim 11, wherein said mobile control device includes a personal digital assistant.

15. The system of claim 14, wherein said personal digital assistant includes:
    a computer-accessible memory; and a microprocessor operatively coupled to said computer-accessible memory and configured to function as an Internet browser.

16. The system of claim 11, wherein said mobile control device includes a cellular telephone.

17. The system of claim 16, wherein said cellular telephone includes:
    a computer-accessible memory; and
    a microprocessor operatively coupled to said computer memory and configured to function as an Internet browser.

18. The system of claim 11, wherein said mobile control device is configured to accept said user personal profile information from a source external to the mobile control device and the user.

* * * * *